United States Patent Office
3,769,272
Patented Oct. 30, 1973

3,769,272
LIGNIN ADDUCT
Harold L. Hintz, Charleston, S.C., assignor to Westvaco Corporation, New York, N.Y.
No Drawing. Filed May 25, 1972, Ser. No. 256,778
Int. Cl. C07g 1/00
U.S. Cl. 260—124 R
4 Claims

ABSTRACT OF THE DISCLOSURE

Lignin adducts comprising the reaction product of lignin with up to 20 moles of 3-chloro-2-hydroxypropane-1-sulfonate per 1000 grams of lignin. These adducts are water soluble and are useful as surfactants, particularly dispersants.

BACKGROUND OF THE INVENTION

(1) Field of the invention

This invention relates to novel adducts of lignin. More specifically, this invention relates to modified lignins that comprise the reaction product of lignin and 3-chloro-2-hydroxypropane-1-sulfonate and their use as dispersants.

(2) The prior art

Lignin and sulfonated lignin materials derived from forest products have found wide spread use as surfactants, in particular as dispersants and coagulants. Also lignin materials in one form or another are also used as drilling mud additives, asphalt emulsifiers, resin extenders and dye dispersants.

Numerous reactants are available to modify lignins in order to improve certain properties, for example, dispersing ability, or to inhibit a property that is undesirable for certain uses, for instance the undesirable dark color of lignin. By way of illustration of methods for modifying lignins, the following patents are cited. U.S. Pat. 3,600,308 to G. G. Allen describes reacting lignin with a variety of chemical agents to increase molecular weight for use as coagulants. U.S. Pat. 3,546,199 to D. T. Christian et al. describes a process for producing polyols from lignin. U.S. Pat. 2,854,444 to L. T. Monson et al. describes a process for oxyalkylating lignin sulfonic acid for use as wetting agents and dispersants. The art cited is meant to show the state of the art and is not intended to be all inclusive of lignin modifications.

Although the invention herein described is to a new lignin product, it has been found particularly useful as a dispersant for disperse and vat dyes, as cement additives, as metal complexing agents and as a dispersant in general.

It is therefore the general object of this invention to provide a novel alkali lignin or sulfonated lignin surfactant characterized by having the phenolic hydroxyl group blocked. Another object of this invention is to provide a dyestuff composition containing a sulfonated lignin having a blocked phenolic hydroxyl group as a dispersing agent.

Further objects, features and advantages of this invention will be evident from the following detailed description of the invention.

SUMMARY OF THE INVENTION

The novel modified lignins of the invention are lignin adducts comprising the reaction product of an alkali lignin or a sulfonated lignin with up to 20 moles, preferably 2 to 10 moles, of 3-chloro-2-hydroxypropane-1-sulfonate per 1000 grams of lignin. The alkali lignin adducts are made water soluble and the already water soluble sulfonated lignin adducts have improved color and dispersing ability. Because of their surface active properties both types of lignin-based adducts are useful as surfactants, particularly as dispersants for dyestuffs.

DETAILED DESCRIPTION OF THE INVENTION

The lignins employed to make the adducts of this invention include alkali lignins from the sulfate pulping process and lignins derived from other alkaline processes such as the soda or modified soda processes, sulfonated lignins, such as sulfite lignins from acid and neutral processes and sulfonated alkali lignins. One of the main sources of lignin is the residual pulping liquors of the paper and pulp industries where lignocellulosic materials such as wood, straw, corn stalks, bagase, and the like are processed to separate the cellulose or pulp from the lignin. For example, the black liquor obtained from the kraft, soda and other alkali processes is not recovered as a sulfonated product but may easily be sulfonated, if desired, by reacting the product with a bisulfite or sulfite. In the sulfite pulping process, the lignocellulosic material is digested with a bisulfite or sulfite to obtain a sulfonated residual pulping liquor wherein the sulfonated lignin is dissolved. Likewise, lignin known as "hydrolysis lignin" obtained from the hydrolysis of lignocellulosic materials in manufacturing wood sugars, or "hydrotropic lignins" derived from hydrotropic pulping processes may be sulfonated and used.

By the term "sulfonated lignin," it is meant any lignin containing at least an effective amount of sulfonate groups to give water solubility in neutral pH solutions. Any of the sulfonated lignins may contain up to one-half of the other materials, such as carbohydrates, phenols and other organic and inorganic compounds. The presence of these other materials results in larger consumption of the reactants used to form the adduct; therefore some purification of the lignin starting materials is often desirable. The nonsulfonated lignin materials may be removed by various known methods. Since the chemical structure of lignin varies according to its source and treatment, the following will be used herein to represent both alkali lignin and sulfonated lignin from whatever source. The degree of sulfonation present in the lignin is not a controlling factor in making the adduct but may be used to tailor the adduct to have desired characteristics.

The lignin materials are reacted with up to 20 moles, preferably from 2 to 10 moles per 1000 grams of lignin, of the alkali metal salt of 3-chloro-2-hydroxypropane-1-sulfonate, referred to herein as "CHP." When the starting lignin is a sulfonated lignin improved dispersing ability begins with just a trace of CHP addition although at least one mole is preferred. On the other hand, adducts made with alkali lignin need an additional amount of CHP, usually at least 1 mole per 1000 grams of lignin to become water soluble. The reaction of lignin with CHP may be exemplified as

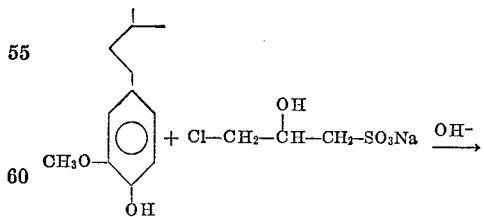

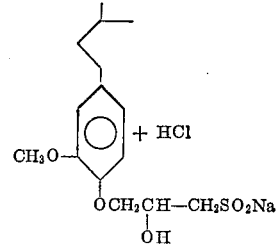

The reaction of the lignin with CHP serves primarily to lower the acidic hydroxyl content of the lignin. Depending upon the starting lignin material, whether residual pulping liquors or a refined product, the phenolic hydroxyl content of the lignin can be reduced to substantially zero. The CHP blocking reaction, at least to some extent, serves to block other ionizable hydroxyl groups such as carboxyl and aliphatic hydroxyls. It has been found that by blocking the hydroxyl groups in lignin with CHP as described herein it is possible to reduce the dark reddish-brown color by 10% or more.

Lignin adducts are made by simply dissolving the lignin in water or alkali, intermixing a given amount of CHP and reacting at a temperature between about 0° C. and 200° C. with the time depending upon the temperature used and the degree of reaction desired. The reacted lignin is allowed to cool and then dried. A catalyst, such as sodium hydroxide, is used if desired. Preparation of CHP may be accomplished by a variety of means, however, one especially satisfactory method is set forth in U.S. Pat. 3,239,560 to C. M. Cambre et al.

The surfactants of this invention are particularly useful as dispersants for disperse dyes or vat dyes in either the dry or liquid form. The blocked lignins may be added to the dye cake before, during or after grinding, with the sulfonated lignins being preferred.

For most dyeing applications lignin adducts having from 3 to 6 moles of CHP per 1000 grams of lignin starting material is preferred. It is generally preferred to add the surfactant prior to grinding so that it will be thoroughly mixed and aid in particle size reduction. The amount of blocked sulfonated lignin dispersants added to a dye will vary widely, depending upon the particular dye cake, the material to be dyed and the effect desired. Amounts up to 75% of the sulfonated lignin dispersant, based upon the weight of dried dye cake may be used. The most important factor in determining the proper amount of lignin surfactant to be used in making up the dyestuff is the particular dye cake used. Generally this amount will vary from dye to dye.

The lignin dispersants of this invention have for the most part eliminated the need for other additives in the dyestuff composition, but for special dyeing problems wetting agents, defoamers, carriers or other additives may be included.

The practice of this invention may clearly be seen in the following examples.

EXAMPLE 1

Fifty grams of alkali lignin were slurried in 200 grams of water and 16 grams 50% NaOH were added. The temperature rose to 35° C. and 20 grams of Na-3-chloro-2-hydroxypropane-1-sulfonic acid were added (2 moles/ 1000 g. lignin). The temperature was increased to 85° C. and after ½ hour the solution checked for acid solubility. Twenty ml. of solution was added to 60 ml. water and sulfuric acid added (approximately 5% lignin solution). No precipitation occurred even at pH 1.0. The remainder of the solution was added to 250 ml. water and neutralized to pH 7.0 with 2 N HCl. The lignin remained in solution and was spray dried.

EXAMPLE 2

A number of lignin-CHP adducts were made from a sulfonated lignin using the general procedure for Example 1 and tested for color and as dye surfactants. The sulfonated lignins were supplied by Westvaco Corporation under the trademark Reax.

| Sample number | Moles CHP/ 1,000 g. lignin | Color values, $\epsilon 500$ [1] |
|---|---|---|
| Control | 0 | [2] .60 |
| 1 | 2 | .30 |
| 2 | 3 | .30 |
| 3 | 4 | .30 |

[1] 5% $H_2O_2$, on weight of solids, was applied to each product before the color value was measured.
[2] Average color value of three samples separately produced.

Each of these products were evaluated as dye dispersants in the following solution.

A standard diazo disperse dye solution was prepared by mixing 5 grams of C.I. 21000 (Disperse Brown 1) in one liter of distilled water. The blocked lignin adducts having varying moles of reactant (from 1 mole to 10 moles) were added to the standard dye solution and the dispersing ability, fiber staining, foaming and diazo dye reduction properties measured. The results are shown in the table below.

The test for determining extent of fiber staining caused by lignin based surfactants was to weigh out 10 grams of the lignin based surfactant and dissolve in 300 ml. of tap water. Adjust the pH to 9.0 with acetic acid. Add a 5 gram nylon fiber skein and heat to a boil. Boil the mixture for 15 minutes, wash the skein with tap water and dry in an oven at 105° C.

The test for determining foaming properties of disperse dye surfactants was to weigh out 1 gram of surfactant and dissolve in 100 ml. of tap water. Adjust to pH 9.5 with acetic acid and pour into a 250 ml. graduated cylinder. Rapidly invert 5 times and measure the height of the foam in ml. immediately after completing the inversions and again after 1 minute and 2 minutes have elapsed. If the foam disappears within 2 minutes note the time at which all the foam vanished. Return the solution after all the foam has broken (or 2 min.) and lower the pH to 7.0 with acetic and again perform the inversion and recording part of the test.

The diazo dye reduction test was performed by charging a pressure bomb with 500 mg. of C.I. Disperse Brown 1 dye, 200 cc. water, and 20 grams of sulfonated lignin dispersant. The mixture was thoroughly stirred with the pH adjusted to between 5 and 6 with acetic acid. A 10 gram nylon skein was placed in the dye mixture, the bomb sealed and heated to 130° C. for one hour. After cooling, the skein was removed from the bomb, washed and dried. The reduction in color was compared by visual obseravtion, but may, if desired be determined by analysis of the residual solution with a spectrometer.

| Sample | Moles CHP/ 1,000 grams lignin | Diazo dye reduction [1] | Fiber staining [2] | Foam test,[3] ml. of foam | | | | |
|---|---|---|---|---|---|---|---|---|
| | | | | pH 7.0 | | | pH 9.5 | |
| | | | | Init. | 1 min. | 2 min. | Init. | 1 min. |
| Control | 0 | 4 | 4-5 | 50 | 10 | 6 | 35 | (15) |
| 1 | 2 | 3 | 4 | 35 | 5 | (35) | 20 | (10) |
| 2 | 3 | 2 | 2 | 25 | (55) | | 20 | (10) |
| 3 | 4 | 1 | 1 | 20 | (20) | | 15 | (5) |

[1] 1=Little or no diazo dye reduction, 5=severe diazo dye reduction.
[2] 1=Little or no fiber staining, 5=severe fiber staining.
[3] Number in parentheses represent seconds required for the foam to break.

In all cases the fiber staining and diazo dye reducing tendencies were compared with the conventional sulfonated lignin dispersant (control). Furthermore, good dispersant properties were retained and foaming decreased significantly.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. Lignin adducts comprising the reaction product of lignin and up to 20 moles of the sodium salt of 3-chloro-2-hydroxypropane-1-sulfonate per 1000 grams of lignin.

2. The product of claim 1 wherein said lignin is alkali lignin.

3. The product of claim 1 wherein said lignin is a lignin sulfonate.

4. The product of claim 2 wherein the lignin is reacted with from 2 moles to 10 moles of the sodium salt of 3-chloro-2-hydroxypropane-1-sulfonate.

References Cited
UNITED STATES PATENTS 2,578,695   12/1951   Goss _____ 260—124 R LEWIS GOTTS, Primary Examiner D. R. PHILLIPS, Assistant Examiner U.S. Cl. X.R.

8—34, 83, 89; 252—353